(12) United States Patent
Choi et al.

(10) Patent No.: US 12,548,833 B2
(45) Date of Patent: Feb. 10, 2026

(54) BATTERY MODULE AND BATTERY PACK COMPRISING SAME

(71) Applicant: LG Energy Solution, Ltd., Seoul (KR)

(72) Inventors: Jonghwa Choi, Daejeon (KR);
Junyeob Seong, Daejeon (KR);
Myungki Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 618 days.

(21) Appl. No.: 17/603,496

(22) PCT Filed: Jun. 22, 2020

(86) PCT No.: PCT/KR2020/008067
§ 371 (c)(1),
(2) Date: Oct. 13, 2021

(87) PCT Pub. No.: WO2021/071052
PCT Pub. Date: Apr. 15, 2021

(65) Prior Publication Data
US 2022/0181733 A1 Jun. 9, 2022

(30) Foreign Application Priority Data
Oct. 7, 2019 (KR) .......................... 10-2019-0123773

(51) Int. Cl.
*H01M 50/211* (2021.01)
*H01M 10/48* (2006.01)
(Continued)

(52) U.S. Cl.
CPC ......... *H01M 50/211* (2021.01); *H01M 10/48* (2013.01); *H01M 10/613* (2015.04);
(Continued)

(58) Field of Classification Search
CPC ............. H01M 50/211; H01M 50/507; H01M 50/233; H01M 10/613; H01M 10/653;
(Continued)

(56) References Cited

U.S. PATENT DOCUMENTS

2009/0305116 A1 12/2009 Yang et al.
2010/0248008 A1* 9/2010 Sugawara ........... H01M 50/569
429/159
(Continued)

FOREIGN PATENT DOCUMENTS

CN 103247766 A 8/2013
CN 105098111 A 11/2015
(Continued)

OTHER PUBLICATIONS

Machine Translation of JP-2013229266-A (Oct. 29, 2025) (Year: 2025).*
(Continued)

*Primary Examiner* — Matthew J Merkling
(74) *Attorney, Agent, or Firm* — Lerner David LLP

(57) ABSTRACT

A battery module includes a stack of battery cells in which a plurality of battery cells are stacked, an end plate covering a front surface or a rear surface of the stack of battery cells, a busbar frame formed between the stack of battery cells and the end plate, a sensing member connected to the busbar frame on an upper side of the stack of battery cells, an insulating plate formed between the end plate and the busbar frame, and side plates covering respective side surface of the stack of battery cells, wherein mounting portions are formed at opposing side ends of the end plate, wherein a lower surface of the stack of battery cells is opened, and wherein the plurality of battery cells are fixed by coupling outermost battery cells of the stack with the side plates, respectively, and coupling the side plates with the end plate.

6 Claims, 6 Drawing Sheets

(51) Int. Cl.
- *H01M 10/613* (2014.01)
- *H01M 10/653* (2014.01)
- *H01M 10/6551* (2014.01)
- *H01M 50/233* (2021.01)
- *H01M 50/507* (2021.01)

(52) U.S. Cl.
CPC ..... *H01M 10/653* (2015.04); *H01M 10/6551* (2015.04); *H01M 50/233* (2021.01); *H01M 50/507* (2021.01); *H01M 2220/20* (2013.01)

(58) Field of Classification Search
CPC ............. H01M 10/6551; H01M 10/48; H01M 2220/20
See application file for complete search history.

(56) References Cited

U.S. PATENT DOCUMENTS

| | | | |
|---|---|---|---|
| 2011/0033736 A1* | 2/2011 | Meintschel | H01M 10/6554 429/158 |
| 2011/0052961 A1* | 3/2011 | Lamm | H01M 50/509 429/120 |
| 2011/0070474 A1 | 3/2011 | Lee et al. | |
| 2012/0301769 A1* | 11/2012 | Okada | H01M 10/625 429/120 |
| 2013/0004822 A1* | 1/2013 | Hashimoto | H01M 10/6554 429/120 |
| 2013/0157103 A1* | 6/2013 | Osakabe | H01M 10/0481 429/120 |
| 2013/0183571 A1* | 7/2013 | Miyazaki | H01M 50/264 429/156 |
| 2013/0202926 A1 | 8/2013 | Yoon | |
| 2014/0045027 A1 | 2/2014 | Suzuki | |
| 2014/0113171 A1* | 4/2014 | Schaefer | H01M 10/6555 165/185 |
| 2015/0064541 A1* | 3/2015 | Noh | H01M 50/209 429/156 |
| 2015/0136438 A1* | 5/2015 | Lumetta | H01R 4/029 174/68.2 |
| 2015/0303425 A1 | 10/2015 | Kong | |
| 2015/0333305 A1* | 11/2015 | Seki | H01M 10/613 429/152 |
| 2016/0072116 A1 | 3/2016 | Yanagihara et al. | |
| 2016/0093931 A1 | 3/2016 | Rawlinson et al. | |
| 2016/0172727 A1 | 6/2016 | Chan et al. | |
| 2016/0301043 A1 | 10/2016 | Morisaku et al. | |
| 2017/0084886 A1* | 3/2017 | Tononishi | H01M 50/271 |
| 2017/0125756 A1* | 5/2017 | Nietling | H01M 50/209 |
| 2017/0256830 A1 | 9/2017 | Qiu et al. | |
| 2018/0048033 A1 | 2/2018 | Lee et al. | |
| 2018/0108881 A1 | 4/2018 | Jin et al. | |
| 2018/0138565 A1 | 5/2018 | Lee et al. | |
| 2018/0342775 A1* | 11/2018 | Sei | H01M 50/507 |
| 2018/0358668 A1 | 12/2018 | Doege | |
| 2019/0001838 A1 | 1/2019 | Choi et al. | |
| 2019/0074562 A1 | 3/2019 | Kim et al. | |
| 2019/0198952 A1 | 6/2019 | Choi et al. | |
| 2019/0348720 A1 | 11/2019 | Oh et al. | |
| 2019/0389318 A1 | 12/2019 | Lee et al. | |
| 2020/0014005 A1 | 1/2020 | Lee et al. | |
| 2020/0076025 A1 | 3/2020 | Jo et al. | |
| 2020/0112014 A1 | 4/2020 | Kim et al. | |
| 2020/0144580 A1 | 5/2020 | Hong et al. | |
| 2020/0194851 A1 | 6/2020 | Seo et al. | |
| 2020/0259155 A1 | 8/2020 | Lee et al. | |
| 2020/0411926 A1* | 12/2020 | Zhang | H01M 10/4207 |
| 2021/0036277 A1 | 2/2021 | Seo et al. | |
| 2021/0057708 A1 | 2/2021 | Castillo et al. | |
| 2021/0242541 A1* | 8/2021 | Sasaki | H01R 13/518 |
| 2022/0247004 A1 | 8/2022 | Yun | |
| 2022/0278387 A1 | 9/2022 | Takata et al. | |
| 2023/0291022 A1* | 9/2023 | Han | H01M 50/276 |

FOREIGN PATENT DOCUMENTS

| | | | |
|---|---|---|---|
| CN | 107534196 A | 1/2018 | |
| CN | 107615515 A | 1/2018 | |
| CN | 207818670 U | 9/2018 | |
| CN | 108666494 A | 10/2018 | |
| CN | 208478403 U | 2/2019 | |
| JP | 2005243268 A | 9/2005 | |
| JP | 2012212609 A | 11/2012 | |
| JP | 2013161792 A | 8/2013 | |
| JP | 2013229266 A * | 11/2013 | |
| JP | 3195826 U | 2/2015 | |
| JP | 2015046379 A | 3/2015 | |
| JP | 5892148 B2 | 3/2016 | |
| JP | 2018073545 A | 5/2018 | |
| JP | 2018536967 A | 12/2018 | |
| KR | 20150024724 A | 3/2015 | |
| KR | 20150064257 A | 6/2015 | |
| KR | 101647825 B1 | 8/2016 | |
| KR | 20160149836 A | 12/2016 | |
| KR | 20170006171 A | 1/2017 | |
| KR | 20170036639 A | 4/2017 | |
| KR | 20170107798 A | 9/2017 | |
| KR | 20180038253 A | 4/2018 | |
| KR | 20180080813 A | 7/2018 | |
| KR | 20180099437 A | 9/2018 | |
| KR | 20190026237 A | 3/2019 | |
| KR | 20190027096 A | 3/2019 | |
| KR | 20190064887 A | 6/2019 | |
| KR | 20190071454 A | 6/2019 | |
| KR | 20190073933 A | 6/2019 | |
| KR | 20190092835 A | 8/2019 | |
| KR | 20190109020 A | 9/2019 | |
| KR | 20190110782 A | 10/2019 | |
| KR | 20190112583 A | 10/2019 | |
| WO | WO-2012043594 A1 * | 4/2012 | H01M 10/613 |
| WO | 2017052296 A1 | 3/2017 | |
| WO | 2018159928 A1 | 9/2018 | |
| WO | 2019124876 A1 | 6/2019 | |
| WO | 2019172545 A1 | 9/2019 | |
| WO | 2019177275 A1 | 9/2019 | |
| WO | 2019182251 A1 | 9/2019 | |

OTHER PUBLICATIONS

Machine Translation of WO-2012043594-A1 (Oct. 29, 2025) (Year: 2025).*
Extended Search Report for Application No. 20873430.1 dated May 13, 2022. 7 pgs.
Extended Search Report for Application No. 20873701.5 dated May 19, 2022. 8 pgs.
Search Report dated Feb. 23, 2024 from the Office Action for Chinese Application No. 202080031565.X Issued Feb. 28, 2024, pp. 1-2.
Search Report dated Dec. 5, 2022 from the Office Action for Chinese Application No. 202080030611.4 issued Dec. 9, 2022, pp. 1-3. [See p. 1, categorizing the cited references].
Search Report dated Feb. 1, 2023 from the Office Action for Chinese Application No. 202080031565.X issued Feb. 9, 2023, pp. 1-3. [See p. 1, categorizing the cited references].
International Search Report for Application No. PCT/KR2020/008067 mailed Sep. 28, 2020, 2 Pages.
International Search Report for Application No. PCT/KR2020/008073 mailed Sep. 28, 2020. 3 pgs.

* cited by examiner

BATTERY MODULE AND BATTERY PACK COMPRISING SAME

CROSS-REFERENCE TO RELATED APPLICATIONS

This application is a national phase entry under 35 U.S.C. § 371 of International Application No. PCT/KR2020/008067, filed Jun. 22, 2020, published in Korean, which claims the benefit of Korean Patent Application No. 10-2019-0123773 filed on Oct. 7, 2019 with the Korean Intellectual Property Office, the disclosures of which are incorporated herein by reference in their entireties.

TECHNICAL FIELD

The present disclosure relates to a battery module and a battery pack comprising the same, and more particularly, to a battery module having a simplified structure and a battery pack comprising the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Such a battery module includes a battery cell stack in which a plurality of battery cells are stacked, a frame accommodating the battery cell stack, a busbar frame formed at each of both ends of the battery cell stack, an end plate formed outside the busbar frame and an insulating plate formed inside the end plate.

FIG. 1 is an exploded perspective view illustrating a module structure of a conventional battery module. FIG. 2 is a schematic view illustrating a cross-section of parts that is assembled in a cross-section when the conventional battery module is assembled into a battery pack.

Referring to FIG. 1, the conventional battery module consists of a stack of battery cells 10, a busbar frame 20 covering front and rear surfaces of the stack of battery cells 10, an upper plate 21 connecting the busbar frame 20 at a top of the stack of battery cells 10, a frame 30 that accommodates the stack of battery cells 10, the busbar frame 20 and the upper plate 21 and is made of a metal, a thermally conductive resin layer 11 formed between a lower surface of the frame and the stack of battery cells, an insulating cover 40 formed on an outer side of the busbar frame 20, and an end plate 50 formed of a metal material on an outer side of the insulating cover 40.

In this case, the frame 30 is formed to cover upper, lower, left and right surfaces of the stack of battery cells 10 and the end plate 50 is made to cover the front and rear surfaces of the stack of battery cells 10, whereby the metal frame is formed in a structure surrounding six surfaces of the stack of battery cells 10, and the thermally conductive resin layer 11 is separately inserted between the lower surface of the stack of battery cells 10 and the metal frame to cool the battery cells 10.

However, the conventional battery module has problems that the six surfaces of the stack of battery cells 10 are surrounded with the metal frame, the thermally conductive resin layer 11 is separately inserted and thus, the weight of the battery module becomes relatively heavy, and that a heat sink 32 is formed in a battery pack, and a thermally conductive resin layer 11 and a frame 30 are located between a thermally conductive layer 31 formed on an upper side of the heat sink 32 and the stacks of battery cells 10 as shown in FIG. 2, so that a cooling path becomes complicated and a cooling performance is deteriorated.

DETAILED DESCRIPTION OF THE INVENTION

Technical Problem

The present disclosure has been made to solve the above-mentioned problems, and it is an object of the present disclosure to provide a battery module having a structure capable of reducing a weight and reducing costs, and a battery pack comprising the same.

It is another object of the present disclosure to provide a battery module having a structure capable of improving a cooling performance, and a battery pack comprising the same.

It is yet another object of the present disclosure to provide a battery module capable of reducing process costs and manufacturing time, and a battery pack comprising the same.

However, the problem to be solved by embodiments of the present disclosure is not limited to the above-described problems, and can be variously expanded within the scope of the technical idea included in the present disclosure.

Technical Solution

In order to achieve the above objects, a battery module and a battery pack comprising the same according to an embodiment of the present disclosure comprise a stack of battery cells in which a plurality of battery cells are stacked, an end plate covering a front surface or a rear surface of the stack of battery cells, a busbar frame formed between the stack of battery cells and the end plate, a sensing member connected to the busbar frame on an upper side of the stack of battery cells, an insulating plate formed between the end plate and the busbar frame, and side plates covering respective side surface of the stack of battery cells, wherein mounting portions are formed at opposing side ends of the end plate, and a lower surface of the stack of battery cells is opened, wherein outermost battery cells of the stack of battery cells and the side plate are coupled to each other, respectively, to fix the plurality of battery cells. In the battery pack includes the battery module, a thermally conductive layer that is in contact with the lower surface of the stack of battery cells on a lower side of the battery module, and a heat sink located on a lower side of the thermally conductive layer.

The end plate and the side plates may be joined to each other by welding.

The battery module may further comprise an upper plate located on an upper side of the sensing member to cover the upper surface of the stack of battery cells and the sensing member.

The upper plate may be made of a plastic.

The upper plate may be formed of a film.

Each of the side plates may be made of a metal.

The stack of battery cells and the side plates may be coupled with an adhesive agent.

The end plate may be coupled to the busbar frame.

The battery module may further comprise a lower cover covering the lower surface of the stack of battery cells.

The lower cover may be formed of a film.

Advantageous Effects

A battery module and a battery pack comprising the same according to an embodiment of the present disclosure provides effects capable of reducing a weight of the battery module and saving a process cost incurred in manufacturing the battery module, by forming a simple structure that fixes a plurality of battery cells using an end plate and a side plate instead of the existing frame.

Further, the battery module and the battery pack comprising the same according to an embodiment of the present disclosure provides an effect capable of increasing a cooling performance by simplifying a cooling path such in a manner that the plurality of battery cells and the thermally conductive layer formed in the battery pack are in contact with each other.

Further, the battery module and the battery pack comprising the same according to an embodiment of the present disclosure can reduce a welding line since it is sufficient to couple only the end plate and the side plate, and thus, provide effects capable of lowering the process cost and reducing the manufacturing time.

The effects of the present disclosure are not limited to the effects mentioned above and additional other effects not described above will be clearly understood from the description of the appended claims by those skilled in the art.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated based on actual scales, but parts of the constituent elements may be exaggerated in size.

As used herein, terms such as first, second, and the like may be used to describe various components, and the terms are used only to discriminate one component from another component.

Further, the terms used herein are used only to describe exemplary embodiments, and are not intended to limit the present disclosure. A singular expression includes a plural expression unless they have definitely opposite meanings in the context. It should be understood that the terms "comprise", "include", and "have" as used herein are intended to designate the presence of stated features, numbers, steps, constitutional elements, or combinations thereof, but it should be understood that they do not preclude a possibility of existence or addition of one or more other features, numbers, steps, constitutional elements, or combinations thereof.

Hereinafter, a battery module according to an embodiment of the present disclosure will be described with reference to FIG. 3 and FIG. 4.

Figure 3:
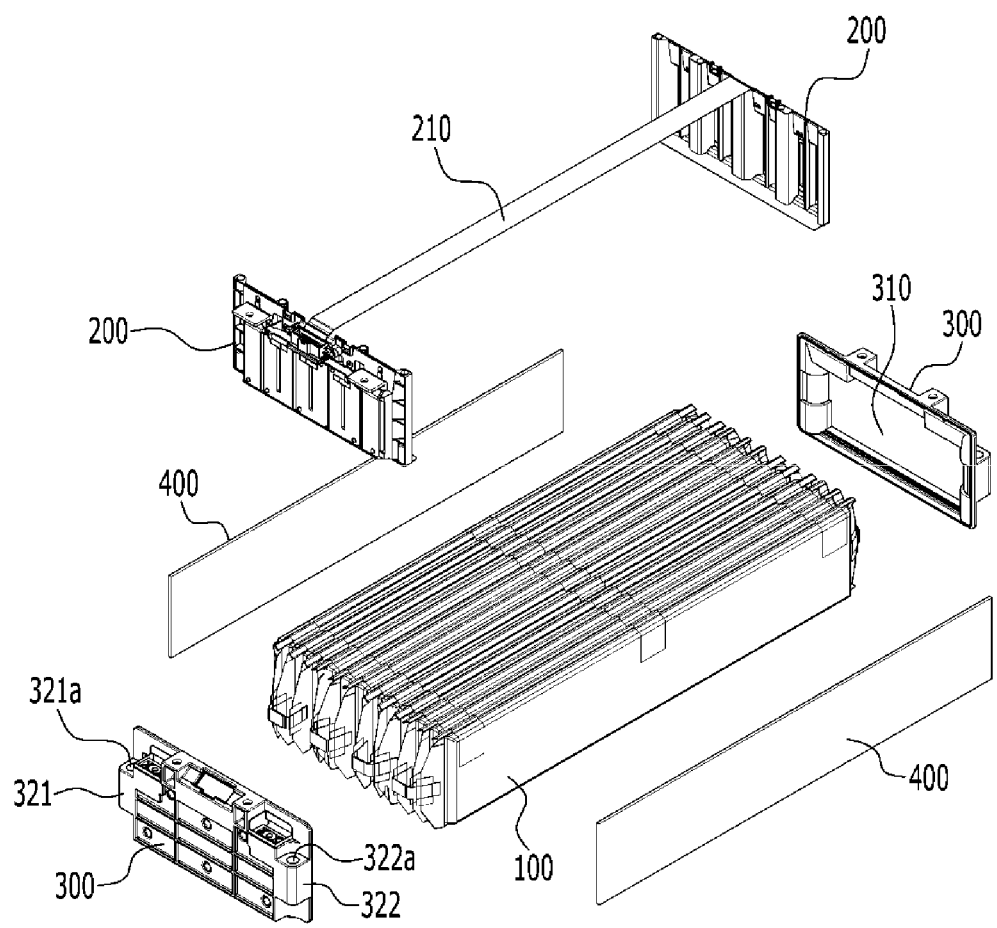
FIG. 3 is an exploded perspective view showing a battery module according to an embodiment of the present disclosure.

FIG. 3 is an exploded perspective view showing a battery module according to an embodiment of the present disclosure. FIG. 4 is a schematic view showing a cross-section of components that are assembled when a battery module according to an embodiment of the present disclosure is assembled into a battery pack.

Figure 4:
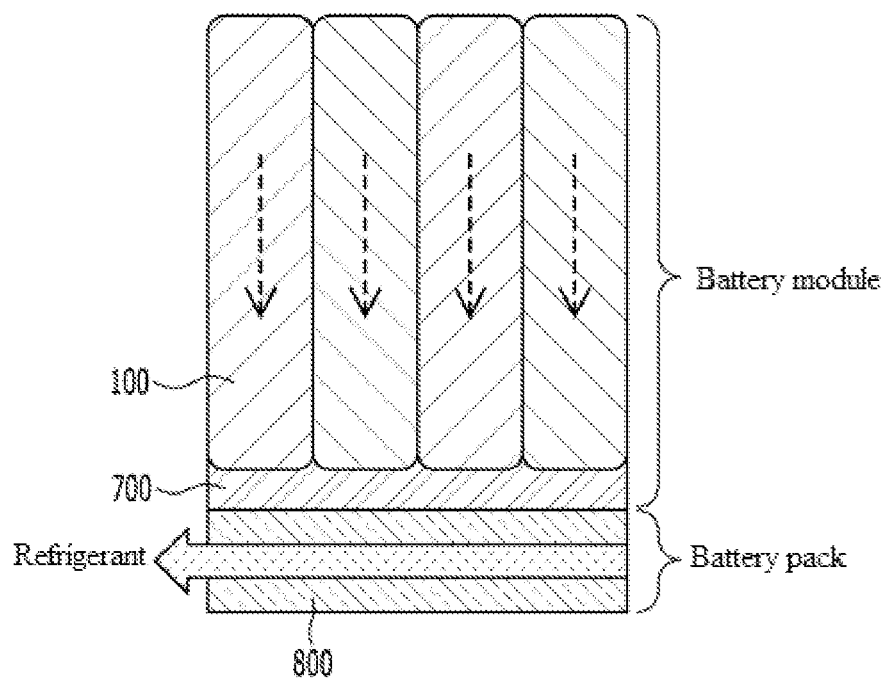
FIG. 4 is a schematic view showing a cross-section of components that are assembled when the battery module according to an embodiment of the present disclosure is assembled into a battery pack.

Referring to FIG. 3 and FIG. 4, the battery module according to an embodiment of the present disclosure comprises a stack of battery cells 100 in which a plurality of battery cells are stacked, an end plate 300 covering front and rear surfaces of the stack of battery cells, a busbar frame 200 formed between the stack of battery cells and the end plate 300, a sensing member 210 connecting the busbar frames on an upper side of the stack of battery cells, an insulating plate 310 formed between the end plate 300 and the busbar frame 200, and a side plate 400 covering both side surfaces of the stack of battery cells, wherein mounting portions 321, 322 are formed at both side ends of the end plate 300, wherein a lower surface of the stack of battery cells is opened, and wherein outermost battery cells of the stack of battery cells and the side plates 400 are coupled to each other and the side plates 400 and the end plates 300 are coupled to each other to fix the plurality of battery cells.

The battery cell 100 is a secondary battery and may be configured as a pouch-shaped secondary battery. Such a battery cell 100 may be composed of a plurality of cells, and the plurality of battery cells 100 may be stacked together to form the stack of battery cells such that they can be electrically connected to each other. Each of the plurality of battery cells may include an electrode assembly, a battery case, and an electrode lead protruding from the electrode assembly (not shown).

The busbar frame 200 is formed on the front and rear surfaces of the stack of battery cells, respectively. The busbar frame 200 may be formed by covering the front and rear surfaces of the stack of battery cells so as to electrically connect the electrode leads of the plurality of battery cells 100.

The sensing member 210 connects the busbar frame 200 formed on the front surface of the stack of battery cells and the busbar frame 200 formed on the rear surface of the stack of battery cells at the upper side of the stack of battery cells. Each of the busbar frames 200 formed on the front and rear surfaces of the stack of battery cells may be electrically connected through the sensing member 210.

The end plate 300 is formed to cover the front and rear surfaces of the stack of battery cells, and may be coupled with the busbar frame 200 to protect the busbar frame 200 and various electrical devices connected thereto from an external impact. Further, the end plate 300 may have a battery module mounting structure as a constitutive element of the frame. In addition, a terminal busbar formed in the busbar frame 200 protrudes to the outside through an opening of the end plate 300, so that the electrical connection can be guided between the busbar frame 200 and an external power source.

The insulating plate 310 is formed between the stack of battery cells and the end plate 300 to cover the front and rear surfaces of the stack of battery cells. The insulating plate 310 is formed to cover the busbar frame 200 and can cut off electrical connection between the busbar frame 200 and the outside. According to an embodiment of the present disclosure, the insulating plate 310 may be made of a plastic having an insulating function.

A mounting portion 321, 322 is formed at both side ends of the end plate 300, and the battery module according to an embodiment of the present disclosure may be coupled to a battery pack through the mounting portion 321, 322. As shown in FIG. 3, the mounting portion 321, 322 may include a first mounting portion 321 formed at one side end of the end plate 300 and a second mounting portion 322 formed at the other side end of the end plate 300. Each of the mounting portions may include a coupling hole formed through a perforation in the up and down directions. The first mounting portion 321 may include a first coupling hole 321a and the second mounting portion 322 may include a second coupling hole 322a. The battery module according to an embodiment of the present disclosure may be coupled to the battery pack through such a coupling hole.

The side plate 400 is formed to cover both side surfaces of the stack of battery cells. According to an embodiment of the present disclosure, the side plate 400 may be made of a metal, and the outermost battery cells formed on both sides of the stack of battery cells and the side plates 400 on both the sides may be bonded with an adhesive agent, respectively, and also be coupled by pressing each other. However, the method of coupling the stack of battery cells and the side plate is not limited thereto, and may be coupled in various ways.

The end plate 300 and the side plate 400 are coupled to each other to fix the plurality of battery cells 100 located inside the plates. A cell swelling phenomenon that may be generated in the plurality of battery cells may be controlled through the end plate 300 and the side plate 400 coupled in the above way. According to an embodiment of the present disclosure, the end plate 300 and the side plate 400 may be joined to each other by welding.

In a battery module of the prior art, a frame is formed to cover upper, lower, left and right surfaces of the stack of battery cells, which makes a weight of the battery module relatively heavy and makes it costly to manufacture the frame. However, the battery module according to an embodiment of the present disclosure can reduce the weight of the battery module and save the cost incurred in manufacturing the battery module by eliminating the use of the conventional frame, and instead fixing and protecting the stack of battery cells with only the end plate and the side plate. In addition, since the battery module according to an embodiment of the present disclosure is required to join only the contact sites of the side plate and the end plate by welding, compared to welding and coupling all the edge parts of the conventional frame and the end plate, the welding line is shortened, and thus the process cost and the manufacturing time can be saved.

The battery module according to an embodiment of the present disclosure may be formed such that a lower surface of the stack of battery cells 100 is opened. The opening of the lower surface of the stack of battery cells 100 means that the lower surface of the stack of battery cells 100 is not covered by the frame or the plate as in the prior art. Therefore, when the battery module is installed to the battery pack, the lower surface of the stack of battery cells can be in contact with a thermally conductive layer 700 formed in the battery pack according to an embodiment of the present disclosure, and connected to a heat sink 800 formed on a lower side of the thermally conductive layer 700 through the thermally conductive layer 700.

The thermally conductive layer 700 may be expressed as a TIM (thermal interface material), and the thermally conductive layer 700 may transfer a heat generated from the plurality of battery cells 100 in the battery module to the outside of the battery module. The heat sink 800 contacts with the thermally conductive layer 700 and can discharge the heat transferred from the thermally conductive layer 700 to the outside through a refrigerant flowing inside the heat sink 800.

Figure 1:
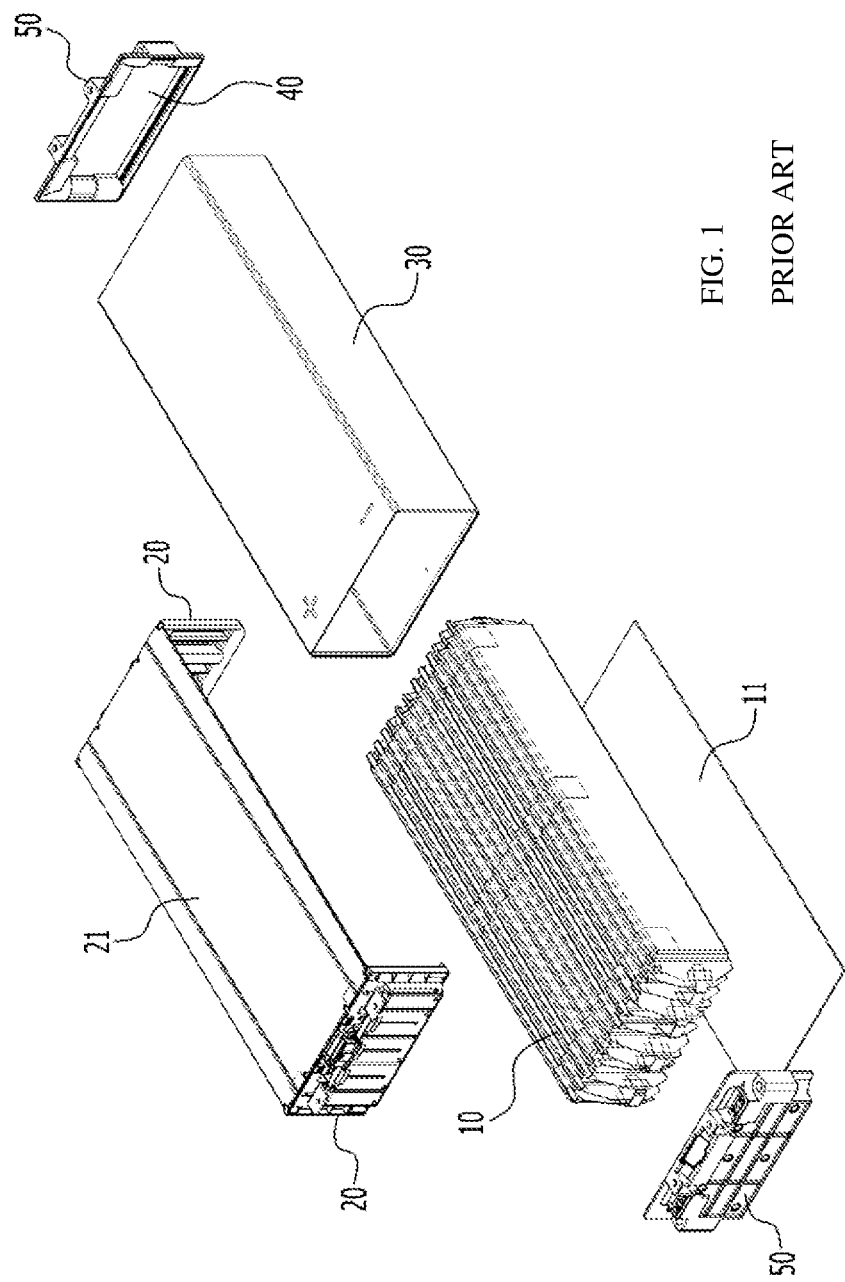
FIG. 1 is an exploded perspective view showing a module structure of a conventional battery module.
Figure 2:
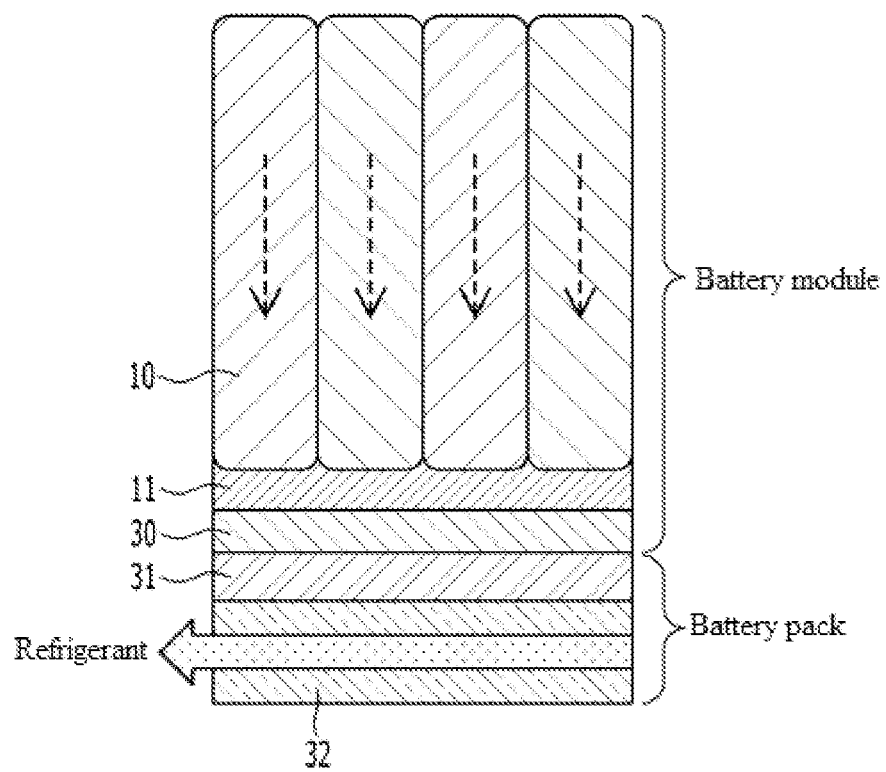
FIG. 2 is a schematic view illustrating a cross-section of parts that is assembled in a cross-section when the conventional battery module is assembled into a battery pack.

As shown in FIG. 2 of the prior art, a heat generated from a battery cell could be released to the outside only when it passed through a thermally conductive resin, a frame, a thermally conductive layer, and a heat sink in order. However, according to an embodiment of the present disclosure, since the battery cell 100 contacts the thermally conductive layer 700 in the battery pack directly by eliminating the use of the thermally conductive resin and the frame, the heat generated from the battery cell 100 can be directly discharged to the outside through only the thermally conductive layer 700 and the heat sink 800. Accordingly, the battery module of the present disclosure can improve a cooling performance by virtue of simplification of the heat transfer path. In addition, since there is no need to use the thermally conductive resin, it is possible to reduce the weight of the battery module and save the cost rendered in manufacturing the battery module.

Hereinafter, a battery module formed with an upper plate according to a modified embodiment of the present disclosure will be described.

Figure 5:
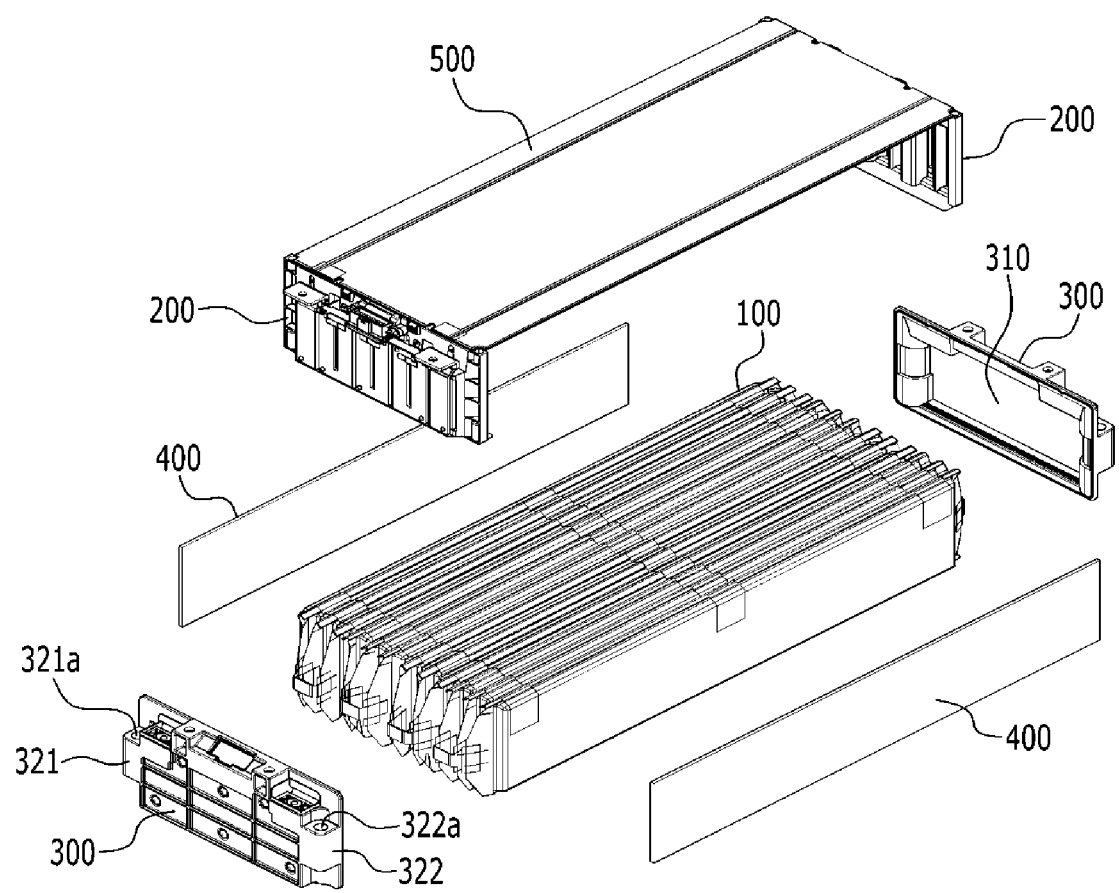
FIG. 5 is an exploded perspective view showing a battery module formed with an upper plate according to a modified embodiment of the present disclosure.

FIG. 5 is an exploded perspective view showing a battery module in which an upper plate is formed according to a modified embodiment of the present disclosure.

Referring to FIG. 5, the battery module according to a modified embodiment of the present disclosure may further comprise the upper plate 500 located on an upper side of the sensing member to cover an upper surface of the stack of battery cells 100 and the sensing member.

The upper plate 500 according to a modified embodiment of the present disclosure may be made of a plastic lighter than a metal, and also formed of a film lighter than the plastic. Accordingly, a weight of the battery module can be lighter than that of the frame upper side structure conventionally formed of metal, while the electric structure of the battery module can be protected on the upper side of the stack of battery cells by the upper plate 500.

Except for the above-described contents, the contents are the same as those described for the battery module and the battery pack according to a modified embodiment of the present disclosure.

Hereinafter, a battery module formed with a lower cover according to a modified embodiment of the present disclosure will be described.

Figure 6:
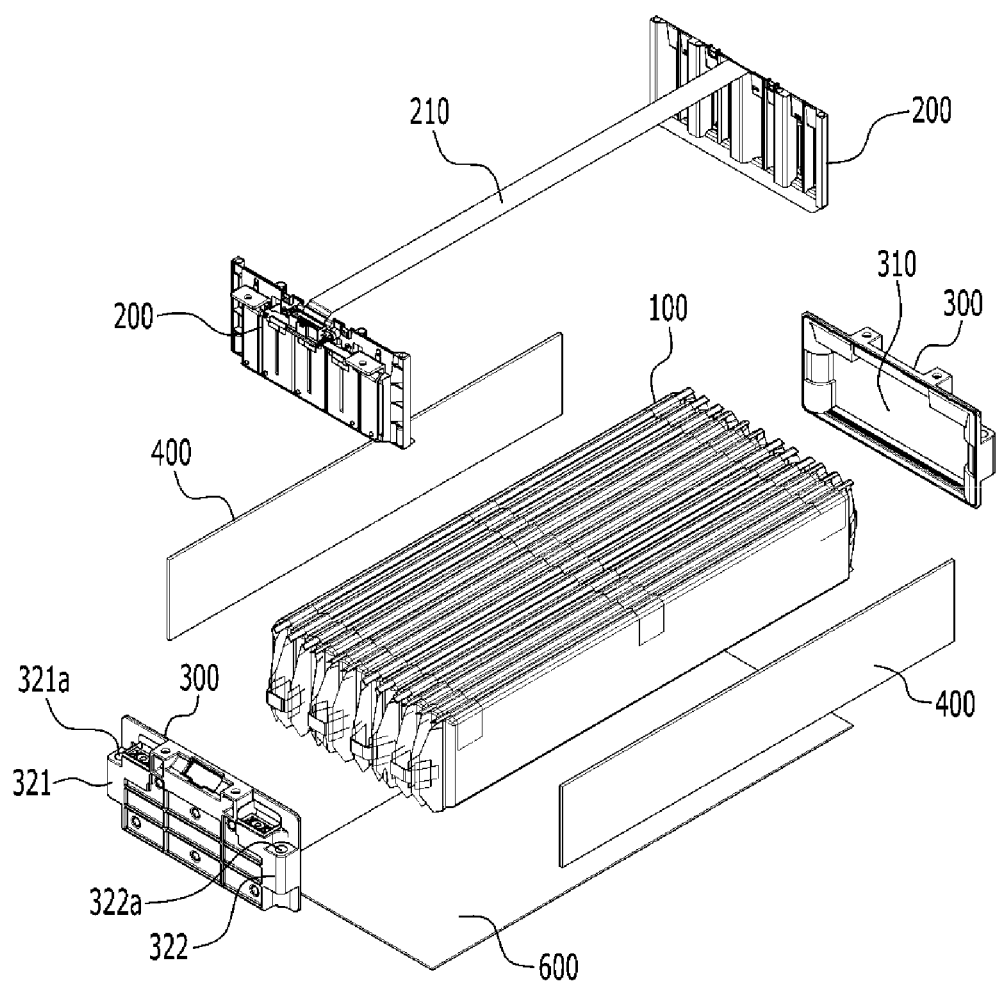
FIG. 6 is an exploded perspective view showing a battery module formed with a lower cover according to a modified embodiment of the present disclosure.

FIG. 6 is an exploded perspective view showing a battery module in which a lower cover is formed according to a modified embodiment of the present disclosure.

Referring to FIG. 6, the battery module according to a modified embodiment of the present disclosure may further comprise the lower cover 600 covering a lower surface of the stack of battery cells 100. According to a modified embodiment of the present disclosure, the lower cover 600 may be formed of a film lighter than a metal. Therefore, a weight of the battery module can be lighter than that of the frame lower side structure conventionally formed of the metal, and unexpected damage that may be caused by a lower surface of the stack of battery cells when the battery module is assembled to the battery pack can be prevented through the lower cover 600 in advance.

Except for the above-described contents, the contents are the same as those described for the battery module and the battery pack according to a modified embodiment of the present disclosure.

The battery module described above may be included in the battery pack. The battery pack may have a structure packed by adding a BMS (battery management system) that collects one or more battery modules according to the present embodiment and manages a temperature or a voltage of the battery, a cooling device, and the like. A plurality of battery modules may be installed in this battery pack. The heat generated from the battery cells can be released to the outside through the heat sink that is brought into contact with the thermally conductive layer by contacting the lower surface of the stack of battery cells formed in the plurality of battery modules with the thermally conductive layer formed in the battery pack.

The battery pack comprising the same can be applied to various devices. Such a device may be applied to a vehicle such as an electric bicycle, an electric vehicle, or a hybrid vehicle, but the present disclosure is not limited thereto, and is applicable to various devices that can use a battery module, which also belongs to the scope of the present disclosure.

Although the invention has been shown and described with reference to the preferred embodiments, the scope of the present disclosure is not limited thereto, and numerous other modifications and embodiments can be devised by those skilled in the art that will fall within the spirit and scope of the principles of the invention described in the appended claims. Further, these modified embodiments should not be understood individually from the technical spirit or perspective of the present disclosure.

DESCRIPTION OF REFERENCE NUMERALS

100: battery cell
200: busbar frame
210: sensing member
300: end plate
310: insulating plate
321, 322: first and second mounting portions
321a, 322a: first and second coupling holes
500: upper plate
600: lower cover
700: thermally conductive layer
800: heat sink

The invention claimed is:

1. A battery pack comprising:
a stack of battery cells in which a plurality of battery cells are stacked,
a busbar frame covering at least a portion of at least one surface of the stack of battery cells,
an end plate covering at least a portion of the busbar frame and/or the stack of battery cells,
a sensing member connected to the busbar frame, and
side plates separate and distinct from each other and separate and distinct from the end plate, the side plates directly covering and contacting at least a portion of respective side surfaces of the stack of battery cells,
wherein mounting portions are formed at opposing side ends of the end plate,
wherein a lower surface of the stack of battery cells is opened, and
wherein outermost battery cells of the stack of battery cells and the side plates are directly coupled to each other, respectively, to fix the plurality of battery cells,
wherein only a thermally conductive layer is in contact with the lower surface of the stack of battery cells on a lower side of the battery pack,
a heat sink is located on a lower side of the thermally conductive layer in direct contact with the thermally conductive layer, and a coolant flows inside the heat sink,
wherein a heat generated from the stack of battery cells is discharged to outside through the thermally conductive layer and the heat sink, and
wherein the stack of battery cells and the side plates are coupled with an adhesive agent, the end plate and the side plates are joined to each other by welding, and the plurality of battery cells are fixed by the end plates and the side plates.

2. The battery pack according to claim 1, wherein the sensing member is connected to the busbar frame on an upper side of the battery cell stack, and an upper plate is located on an upper side of the sensing member to cover at least a portion of an upper surface of the stack of battery cells and the sensing member.

3. The battery pack according to claim 2,
wherein the upper plate is formed of a plastic or a film.

4. The battery pack according to claim 1,
wherein each of the side plates is made of a metal.

5. The battery pack according to claim 1,
wherein the end plate is coupled to the busbar frame.

6. The battery pack of claim 1, further comprising an insulating plate formed between the end plate and the busbar frame.

* * * * *